United States Patent [19]

Yamada

[11] Patent Number: 5,724,859
[45] Date of Patent: Mar. 10, 1998

[54] SHAFT LOCK MECHANISM

[75] Inventor: Tsuneo Yamada, Kashiwazaki, Japan

[73] Assignee: Kato Springs Work Co., Ltd., Tokyo, Japan

[21] Appl. No.: 572,680

[22] Filed: Dec. 14, 1995

Related U.S. Application Data

[63] Continuation-in-part of Ser. No. 969,989, Nov. 2, 1992, abandoned.

[30] Foreign Application Priority Data

Nov. 5, 1991 [JP] Japan .................. 3-090492 U

[51] Int. Cl.⁶ .................................... G05G 5/06
[52] U.S. Cl. .................................... 74/531; 16/225
[58] Field of Search .................. 74/531; 16/355, 16/342, 308, 225, 273

[56] References Cited

U.S. PATENT DOCUMENTS

| | | | |
|---|---|---|---|
| 4,739,967 | 4/1988 | Bowden | 251/297 |
| 4,788,748 | 12/1988 | Bizek | 16/308 |
| 4,964,193 | 10/1990 | Rommelfaeger et al. | 16/308 |
| 5,010,983 | 4/1991 | Kitamura | 188/67 |
| 5,148,717 | 9/1992 | Yamaguchi | 74/493 |
| 5,219,045 | 6/1993 | Porter et al. | 188/67 |

FOREIGN PATENT DOCUMENTS

| | | |
|---|---|---|
| 342538 | 8/1943 | United Kingdom . |
| 556877 | 10/1943 | United Kingdom . |
| 1004230 | 9/1965 | United Kingdom . |
| 1304414 | 1/1973 | United Kingdom . |

*Primary Examiner*—Vinh T. Luong
*Attorney, Agent, or Firm*—Thompson Hine & Flory LLP

[57] ABSTRACT

A shaft lock mechanism comprising a shaft, a support member, and a connecting member; the support member comprising a cylindrical part which encloses and elastically grips the shaft, and a base part extending in a radially outward direction from the cylindrical part. The connecting member has one end fixed at the bracket and is provided with a slit through which the base part of the support member is inserted in order for the support member to be supported without rotation during rotation of the shaft. Within the cylindrical part, a clearance is formed extending in the direction of the shaft. The clearance provides an appropriate amount of frictional resistance between the shaft and the cylindrical part.

7 Claims, 3 Drawing Sheets

SHAFT LOCK MECHANISM

This application is a continuation-in-part of U.S. application Ser. No. 07/969,983, filed Nov. 2, 1992, now abandoned.

BACKGROUND OF THE INVENTION

1. Field of the Invention

The present invention relates to a shaft lock mechanism which enables fixation of a display panel at a set angle to the main body of a computer which is equipped with a keyboard etc., and which is used, for example, in laptop personal computers and word processors.

2. Background Art

In general, the display panel for a laptop computer or a word processor is incorporated as a lid on the main computer body equipped with a keyboard and is opened when the computer is in use. When the display panel is in use, depending on the condition and location of use, light reflected from the display screen causes difficulty in reading letters and pictures on the screen. For this reason, a shaft lock mechanism was developed to enable adjustment of the display panel at any chosen angle to the main computer body.

An example of a shaft lock mechanism which enables adjustment of a display panel with respect to the main body at any chosen angle is disclosed in the first publication of Japanese Utility Model (Hei) 1-135397. This shaft lock mechanism consists of a movable shaft, a fixed shaft of an identical diameter as the movable shaft on each side of the movable shaft, and a coil spring externally surrounding and in close contact with both the movable and the fixed shaft, and the ends of the coil spring are clamped at the outer ends of the fixed shaft. When the movable shaft is rotated in one direction, the diameter of the part of the coil spring in contact with one of the fixed shafts decreases and the friction force acting between the fixed shaft and the coil spring called "locking torque" is generated. At the same time, the diameter of the coil spring on the other side in contact with a fixed shaft of the other side is increased by the same rotational motion and "splitting torque" is generated therefrom. The sum of the locking torque and the splitting torque acting on the movable shaft is to fix the display panel at any chosen angle.

However, in a shaft lock mechanism of the above structure, the degree of control for the adjustment of the display at any chosen angle depends on the strength of the coil spring. Because the coil spring acts in a line-contact with the movable shaft, the contact area is limited to the length of the coil spring. In order to increase the area of surface contact it is necessary to increase the coil diameter to a certain degree. Accordingly, there is a limit to size reduction and weight reduction of the above type of shaft lock mechanism. Therefore, there is a problem of high manufacturing cost. In contrast, if a small size and light weight shaft lock mechanism of this coil spring type of shaft lock mechanism is required, the cost increases as the diameter of the shaft becomes smaller; thus, a new reduced-size and light weight shaft lock mechanism is awaited which can be manufactured at low cost.

SUMMARY OF THE INVENTION

In order to achieve the aforementioned object, the shaft lock mechanism according to the present invention comprises a shaft, a support member, and a connecting member. The support member comprises a base part and cylindrical parts which encases the shaft and elastically holds the shaft, and the support member freely rotates relative to the movable shaft. The base part of the support member extends radially outward from one end of the cylindrical part. The connecting member covers the cylindrical part of the supporting member and is provided with a slit and the base part of the supporting member is clamped by inserting through the slit.

In the shaft lock mechanism of this invention, when the movable shaft is made to rotate in the cylindrical part, the cylindrical part elastically grips the shaft and an elastic force working between the surface of the shaft and that of the cylindrical part. Because this elastic force creates an appropriate amount of friction resistance between the shaft and the cylindrical part, the mechanism maintains a constant resistance independent of the direction of rotations and enables to stop the shaft at any chosen angle.

In another aspect of the present invention, the cylindrical part is combined into one body with the base part to form the supporting member. This combination makes it easy to construct the support member by merely bending a plate into a tubular shape to form the cylindrical part, leaving the flat part which turns out to form the base part.

The cylindrical part is divided into a plurality of parts in the longitudinal direction of the shaft. This division makes possible narrowing of the width of each cylindrical part and thereby easily improves the degree of circularity of each cylindrical part.

Moreover, by including a case in which each cylindrical part is wound around the body of the shaft with its neighboring part in the opposite direction, it is possible to suitably control the frictional resistance based on the rotational direction or, in other words, the working of the rotational torque. For example, it is possible either to equalize the torque in opposite directions or to provide minute differences.

An alternative is possible in which, at the two surfaces by which the cylindrical part and the shaft body face each other, on one face a projection is formed and on the other a concavity corresponding to the projection. This relationship between the projection and the concavity makes possible determination of the placement of the supporting member and the shaft body at a certain relative rotational position.

Furthermore, the invention contains at least one lubricating channel on the surfaces of the cylindrical part and the shaft body mutually facing each other, and through this channel, lubricant is supplied to the frictional surfaces, and it is possible to maintain a smooth sliding condition for a long period.

DESCRIPTION OF PREFERRED EMBODIMENTS

Figure 1:
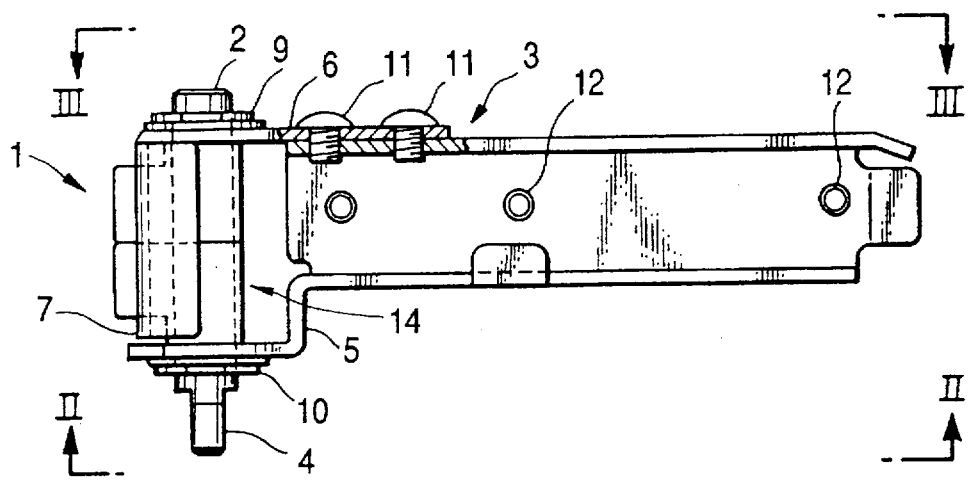
FIG. 1 is a front view of the entire structure of a shaft lock mechanism of the first embodiment according to the present invention.

The shaft lock mechanism according to this invention will be explained as follows with reference to FIGS. 1 to 6. In addition, although this application is explained in terms of examples taken from the mechanism used in laptop computers or personal computer word processors, it can be used for various machines other than these apparatuses.

In the drawings, reference numeral 1 indicates a shaft lock mechanism of the present invention; reference numeral 2 indcates the movable shaft, and reference numeral 3 indicates a bracket which rotatably supports the movable shaft 2.

The movable shaft 2, as shown in FIG. 1, has a cylindrical form and can be made from metals such as SUM (sulphur-added free cutting steel) and SUS (stainless steel), ceramic or resins. At one end of the movable shaft 2 is disposed an attachment part 4 which adjusts the position of the display panel which also functions as the lid of a laptop-model personal computer.

Figure 2:
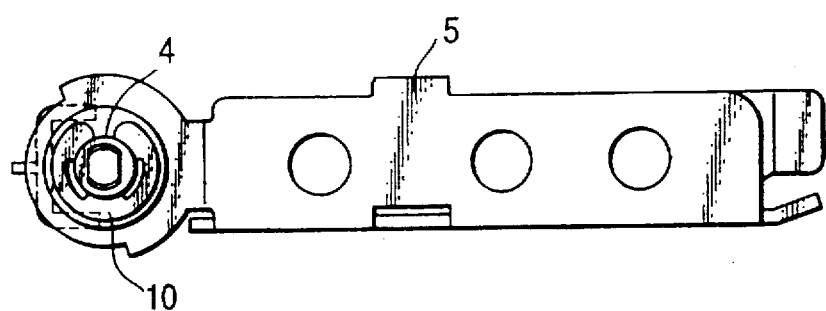
FIG. 2 is a left side view (shown by arrow II in FIG. 1) of the shaft lock mechanism of FIG. 1.
Figure 3:
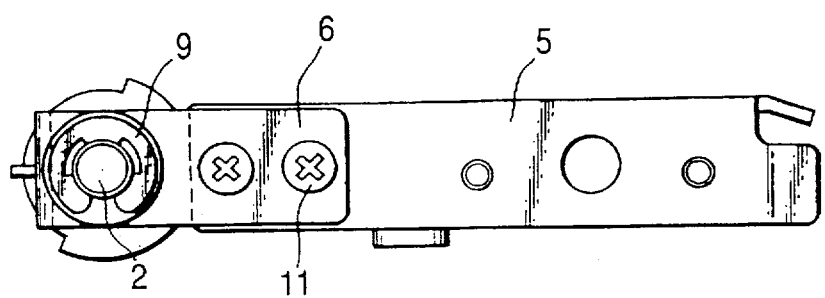
FIG. 3 is a right side view (shown by arrow III in FIG. 1) of the shaft lock mechanism of FIG. 1.
Figure 4:
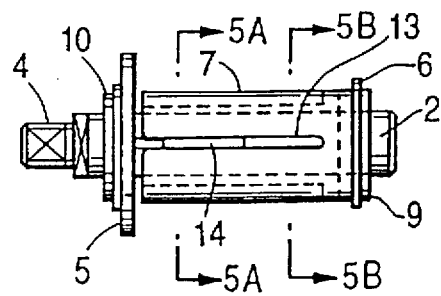
FIG. 4 is a plan view of the shaft lock mechanism of FIG. 1.

Bracket 3 is fixed onto a main body such as a laptop-model personal computer or a word processor and consists of the supporting plates 5 and 6, as shown in FIGS. 2 and 3, which face each other from both end sides of the movable shaft 2; a connecting member 7, shown in FIG. 4, disposed between the facing sides of the support plates 5 and 6 having a channel-like cross section or cylindrical shape surrounding the movable shaft and a support member 14 supported by the connecting member 7.

As shown in FIGS. 2 and 3, on the supporting plates 5 and 6 are formed holes through which the movable shaft 2 is inserted, and slip-preventing rings 9 and 10 are engaged to the movable shaft 2 at the outside of the supporting plates 5 and 6, thereby rotatably supporting the movable shaft 2 without being slipping off. One of the supporting plates 5 extends in the direction away from the shaft and is bent toward the other supporting plate 6, which is attached thereto by bolts 11. Thus, this combination constructs a "frame" structure. Installation holes 12 are provided for setting this "frame" structure to the main computer body or other various accessory parts to the "frame" structure.

Figure 5A:
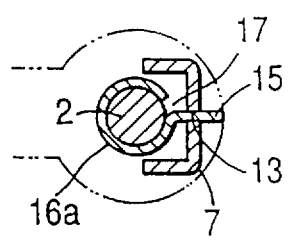
FIG. 5A is a cross sectional view along the line 5A—5A of FIG. 4.
Figure 5B:
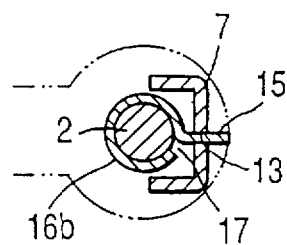
FIG. 5B is a cross sectional view along the line 5B—5B of FIG. 4.

The aforementioned connecting member 7, as shown in FIG. 4, has its one end fixed to the inside surface of the supporting plate 6 and extends in the direction of the supporting plate 5 on the other end. In the connecting member 7 is provided a slit 13 which extends along the axis of the movable shaft 2. Furthermore, the base part 15 of the support member 14 (to be described hereinafter) is inserted into the slit 13 of the connecting member 7 in order for the support member to be supported without rotating during rotation of the movable shaft, as shown in FIGS. 4, 5A and 5B. The structure in which the support member is simply supported by the connecting member 7 makes it easy to replace the support member 14 by another support member when it is necessary to change the frictional force to be exerted on the movable shaft.

Figure 6B:
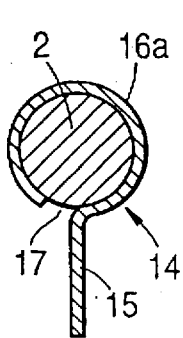
FIG. 6B is a cross sectional view along the line 6B—6B of FIG. 6A.
Figure 6A:
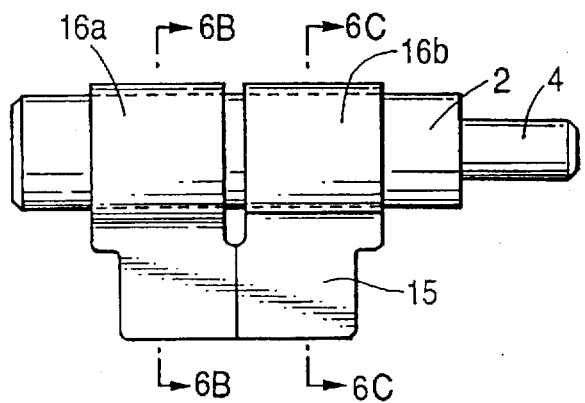
FIG. 6A is a plan view of the movable shaft and the support member in the shaft lock mechanism of the first embodiment in the present invention.
Figure 6C:
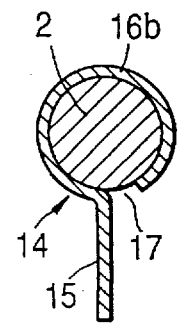
FIG. 6C is a cross sectional view along the line 6C—6C of FIG. 6A.

As shown in FIG. 6A, the support member 14 comprises two tube-shaped cylindrical parts 16, of which one 16b encases the movable shaft clockwise and the other 16a counterclockwise, and a flat base part 15 which extends radially outward from one end of a cylindrical part 16. Each cylindrical part 16 is installed parallel to the length of the shaft. The support member 14 is made by stamping a spring steel metal sheet into the prescribed shape with slits and bending a part of the shaped sheet clockwise and the other part counterclockwise to form the cylindrical parts. The inside diameter of the cylindrical parts 16 is generally made to be smaller than the outside diameter of the movable shaft 2. Two clearances 17 and 17 are formed between the end of the circle of the cylindrical parts 16 and the flat base part 15. One of the clearance is at the left hand side for the base part 15, and the other at the right hand side of the base part 15, as shown in FIGS. 6B and 6C. Thus, the cylindrical parts 16 acquire the elasticity to be able to reduce or expand the diameter of the cylindrical part radially.

In the present invention, the nature of contact between the cylindrical parts 16 and the movable shaft 2 is surface contact, not the line-contact of the spring coil shown in the aforementioned conventional art. Consequently, it is possible to shorten the width of the cylindrical parts 16, and the reduction in size and weight reduction of the shaft lock mechanism is attained by using the plate-type support member 14.

Although the supporting member 14, as described above is fixed to the connecting member 7 by inserting its base part 15 into the slit 13, if necessary, the supporting member 14 and the connecting member 7 can be fixed together by applying adhesion or welding to combine these two parts into one body. The cylindrical part 16 can be made of any elastic material. For example, elastic materials such as spring steel, copper alloy, or synthetic resin can be used therefor.

As described above, the shaft lock mechanism 1 is installed in a laptop personal computer by attaching the bracket 3 to the main body of the computer by means of the holes 12 of the shaft lock mechanism 1. The shaft lock mechanism 1 is also attached to the display board by means of the attachment parts 4 of the movable shaft 2.

When the display board is opened or closed against the main body of the device, the elastic cylindrical part 16 exerts a countering frictional force upon the movable shaft 2 and the movable shaft 2 rotates while in contact with this cylindrical part 16. Since the cylindrical part 16 of the support member 14 is fixed by the connecting member, and the connecting member is attached to the bracket 3, the contact between the cylindrical part 16 and the movable shaft 2 is made to contact between the bracket 3 and the movable shaft 2. Thus, the contact between the bracket 3 and the movable shaft produces frictional resistance and torque to fix the position of the display panel at a chosen angle relative to the bracket 3.

When the torque applied to the movable shaft 2 from outside becomes stronger than the torque generated by the friction resistance between the movable shaft 2 and the bracket 3, the display panel is opened and closed by making the movable shaft 2 rotate relative to the bracket 3.

If the torque for opening and closing the display panel is removed, only the torque which is exerted to close the display board by its own weight is applied between the movable shaft 2 and the bracket 3. Thus, this torque becomes weaker than the friction resistance between the movable shaft 2 and the bracket 3 and makes possible adjusting the position of the display panel at any chosen angle.

Here, since the contact between the movable shaft 2 and the cylindrical part 16 is surface contact, the area of contact is enlarged and a large frictional resistance can be obtained. Therefore, it becomes possible to reduce the diameters of both the movable shaft 2 and the cylindrical part 16, which is effective for reducing the size of the shaft lock mechanism 1.

At the time of rotation of the movable shaft, because each division of the cylindrical part 16 winds around the movable shaft 2 in a mutually opposite direction, the frictional force may be different depending on the design of the support member 14. In other words, if the movable shaft 2 is made to rotate counterclockwise in the cylindrical part 16b wound clockwise, as shown in FIG. 6C, the frictional force between the movable shaft 2 and the cylindrical part 16b is applied in the direction of opening the cylindrical part 16b and in the direction of weakening the elastic force of the cylindrical part 16b. If the movable shaft is made to rotate clockwise in the cylindrical part 16b wound clockwise, the same frictional force is applied in the direction of compressing the cylindrical part 16 and in the direction of strengthening the elastic force of the cylindrical part 16b.

In the present preferred embodiment, as shown in FIG. 6A, during the rotation of the movable shaft, the force exerted as a result of the sum Of the frictional forces generated by the two oppositely facing cylindrical parts 16 produces equal torques, irrespective of the direction of the rotation, and affords easy manipulability in a rotation in either direction.

Figure 7:
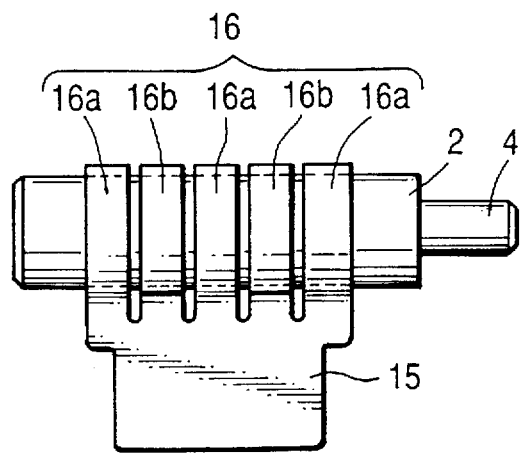
FIG. 7 is a plan view of the movable shaft and the support member in the shaft lock mechanism of the second embodiment of the present invention.

On the other hand, if a different torque is required by the direction of the rotation, for example, when the weight of the panel is fairly large, a large force is necessary to open the computer lid, and the shaft lock mechanism should be adjusted to reduce the friction for opening. In such a case when the directional dependency of the frictional force is necessary, many measures can be adopted; one is to wind the cylindrical parts in the same direction, the other is to divide the cylindrical parts into an odd number of segments such as 3 or 5, and wind segments in opposite directions in ratios of 1:2 or 2:3, in order to designate a suitable value to the torque difference for these opposite directions, as shown in FIG. 7 in the second embodiment. Moreover, as will be shown in a later preferred embodiment, by changing the width of two cylindrical parts along the direction of the shaft, it is possible to assign a torque difference proportional to such width difference.

In addition, a groove which can be used as either a lubricant oil-supplying groove or an oil storage recess can be provided in at least either of the movable shaft 2 or the cylindrical part 16 and therefore grease can be supplied. As a result, this feature prevents freezing-up and oil dripping and makes smooth sliding possible.

Figure 8A:
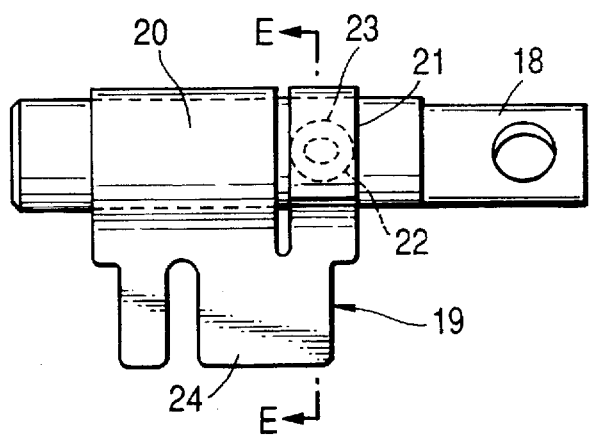
FIG. 8A is a plan view of the movable shaft and the support member in the shaft lock mechanism of the third embodiment of the present invention.
Figure 8B:
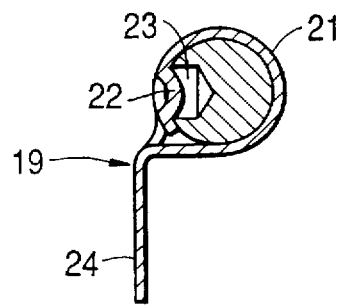
FIG. 8B is a cross sectional view along the line E—E of FIG. 8A.

In FIGS. 8A and 8B, the third preferred embodiment of the present invention is shown. Except for the structures of the movable shaft 18 and the support member 19, the third embodiment has the same features as the one aforementioned. As the support member 19 of this preferred embodiment, of the two cylindrical parts 20 and 21, part 20 is wider than the part 21 in the direction of the shaft, and on the shorter side of the inside wall of the cylindrical part 21 is formed the projection 22. As for the movable shaft 18, at the location on the shaft corresponding to the projection 22 of the aforementioned cylindrical part 21 is provided the concavity 23 which engages with the projection 22. Also, the base part 24 of the supporting member 19 is bent around the boundary between the cylindrical part 20 and 21.

In the third preferred embodiment, the two cylindrical parts 20 and 21 perform different functions. In other words, in the same manner as in the aforementioned preferred embodiment, the inside surface of the larger cylindrical part 20 touches and grips the movable shaft 18 and the frictional force created therefrom supports the weight of the display panel. The smaller cylindrical part 21, in the neighborhood of the projection 22, is separated from the surface of the movable shaft 18 and only the leading part of the projection 22 is in contact with the shaft 18. Therefore, when the movable shaft is rotated, the projection 22 slides past the surface of the movable shaft 18 and when it reaches the concavity 23, the projection 22 is engaged with the concavity. Thus, the smaller cylindrical part 21 functions as a positioning mechanism which holds suspended the supporting member 19 and the movable shaft 18 at a rotational position. Thus, when the display panel is closed or opened, for example, the location of this positioning mechanism is preset at a standard location. Also, although in this particular embodiment there is only one concavity, it is possible to install a multiple number of concavities around the movable shaft 18 and to set the height of the projection 22 and the depth of the concavity 23 at any desired value. When these numbers are appropriately set, at any given location of rotation the projection 22 and the concavity 23 elastically fit together and generate a so-called "click sensation". Thus, it is possible to create a feeling of user-friendliness.

As explained in detail above, the shaft lock mechanism of said invention causes an appropriate amount of frictional resistance to exist between the shaft body and the cylindrical parts and makes possible, through a simple structure, the maintenance a state of suspension involving the mutual rotation of the shaft body and the cylindrical part and the suitable location thereof.

Because the shaft body and the cylindrical parts are in surface contact with each other, in comparison to the contact between a spring and a shaft body of prior part, said invention can acquire the same level of frictional force with smaller diameters. As a result, it is possible to achieve size and weight reduction of the shaft lock mechanism, and because the number of parts is low, and the structure is simple, it is possible to produce the product at a low cost.

The supporting member which includes the cylindrical part can be made easily, for example, by bending one part of one supporting member at a time. Also, by dividing the cylindrical part into many divisions in line with the direction of the shaft, it is possible to shorten the length of each division of the cylindrical part and thereby easily improve the degree of roundness in each division. The improved degree of roundness helps to provide stable torques necessary for rotation. Moreover, because divided cylindrical parts wind around the shaft body in mutually opposite directions, it is possible to control the frictional resistance based on rotational directions or, in other words, rotational torques. Thus, it is possible to control the workings of the torque corresponding to the particular circumstance for applying the present shaft lock mechanism.

Moreover, by providing a projection on the surface of one side of the cylindrical part facing the shaft body and a concavity, which fits in with the projection, on the facing surface of the shaft body, or vice versa, this invention makes possible the positioning of mutual locations of the supporting member and the shaft body.

In addition, by forming an oil-supply groove on at least one of the contacting surfaces of the cylindrical parts and the shaft body, and supplying a grease-like lubricant thereto, said invention prevents frictional wear between these two surfaces and maintains good sliding conditions for a long time.

What is claimed is:

1. A shaft lock mechanism (1) comprising:

a shaft (2);

a support member (14) rotatably enclosing said shaft (2) and support member 14 comprising a cylindrical part (16) elastically gripping said shaft (2), a base part (15) extending from said cylindrical part (16) in a radially outward direction, and a clearance (17) extending along the length of said shaft (2) within cylindrical part (16);

a bracket (3) comprising first support plate (5) and second support plate (6) rotatably supporting said shaft (2); and a connecting member (7), one end of said connecting member (7) being attached to the inside surface of said first support plate (5) and the other end of said connecting member (7) extending to said second support plate (6), said connecting member (7) being provided with a slit (13), said base part (15) of said support member (14) being inserted into said slit (13) to fix said base part (15) with respect to said shaft (2).

2. A shaft lock mechanism according to claim 1, wherein said clearance (17) is formed between the end of said cylindrical part (16) and said base part (15).

3. A shaft lock mechanism according to claim 1, wherein said cylindrical part (16) comprises a plurality of cylindrical segments (16a, 16b) disposed along the direction of said shaft (27), said segments extending around said shaft (2) in opposite directions to exert torque differences on said shaft as said shaft rotates about its longitudinal axis.

4. A shaft lock mechanism according to claim 3, wherein said plurality of cylindrical segments comprise an odd number of cylindrical segments (16a, 16b), said odd number of cylindrical segments (16a, 16b) alternately extending around said shaft (2) in opposite directions in order to exert torque differences on said shaft as said shaft rotates about its longitudinal axis.

5. A shaft lock mechanism according to claim 3, wherein said plurality of cylindrical segments (16a, 16b) extending around said shaft (2) comprises cylindrical segments having different widths in order to exert torque differences on said shaft as said shaft rotates about its longitudinal axis.

6. A shaft lock mechanism according to claim 1, wherein one of the inner surfaces of said cylindrical part of said shaft is provided with a projection, and the outer surface of said movable shaft is provided with a concavity so that the projection fits into said concavity.

7. A shaft lock mechanism according to claim 1, wherein said supporting member (14) comprises a resilient material.

* * * * *